J. M. CARLSON.
DIRECTION INDICATOR FOR TRACTION ENGINES.
APPLICATION FILED MAY 5, 1916.
1,271,851.
Patented July 9, 1918.
2 SHEETS—SHEET 1.
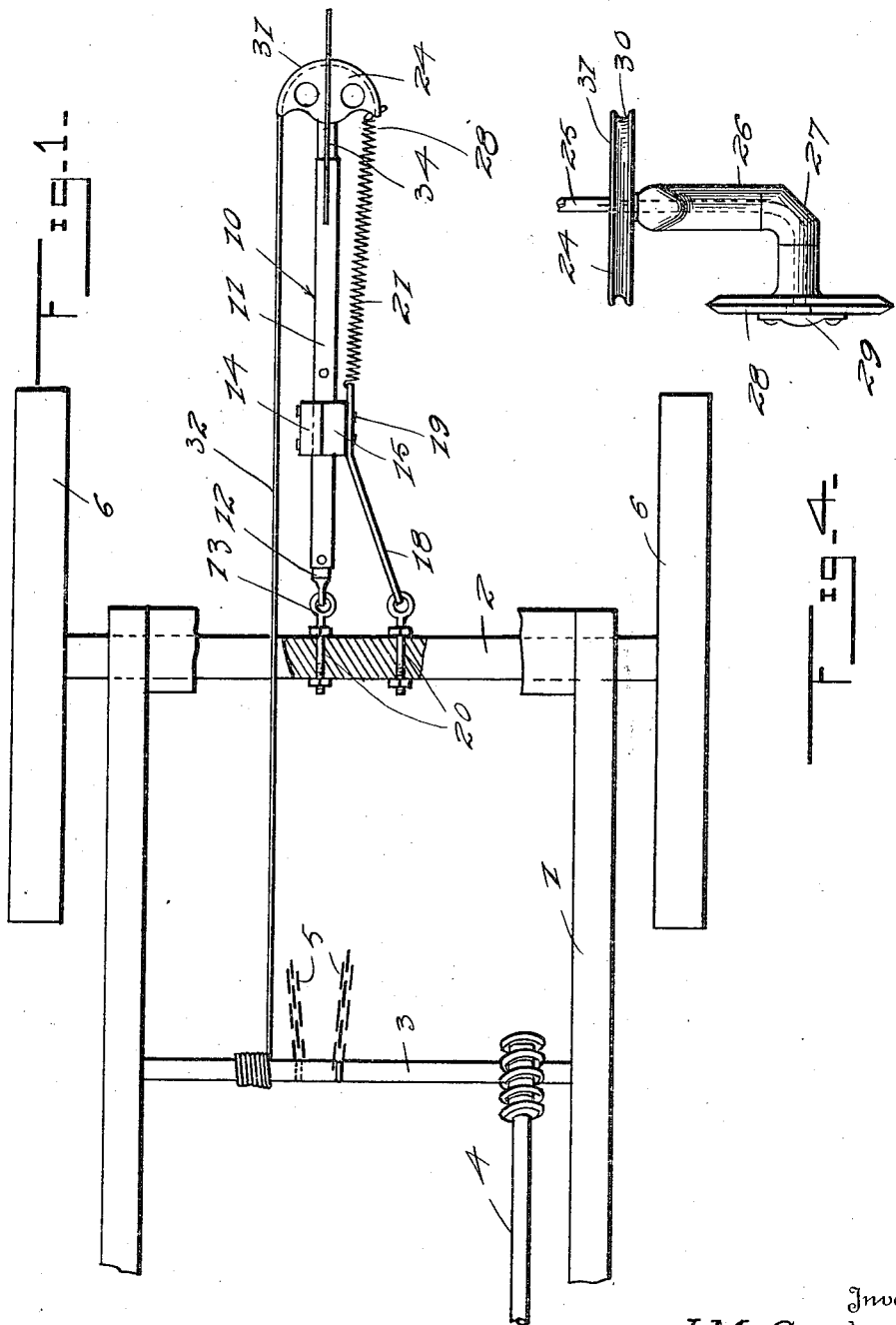
Witness
C. R. Bealle
Rob'n Meyer
Inventor
J. M. Carlson.
By
Attorney

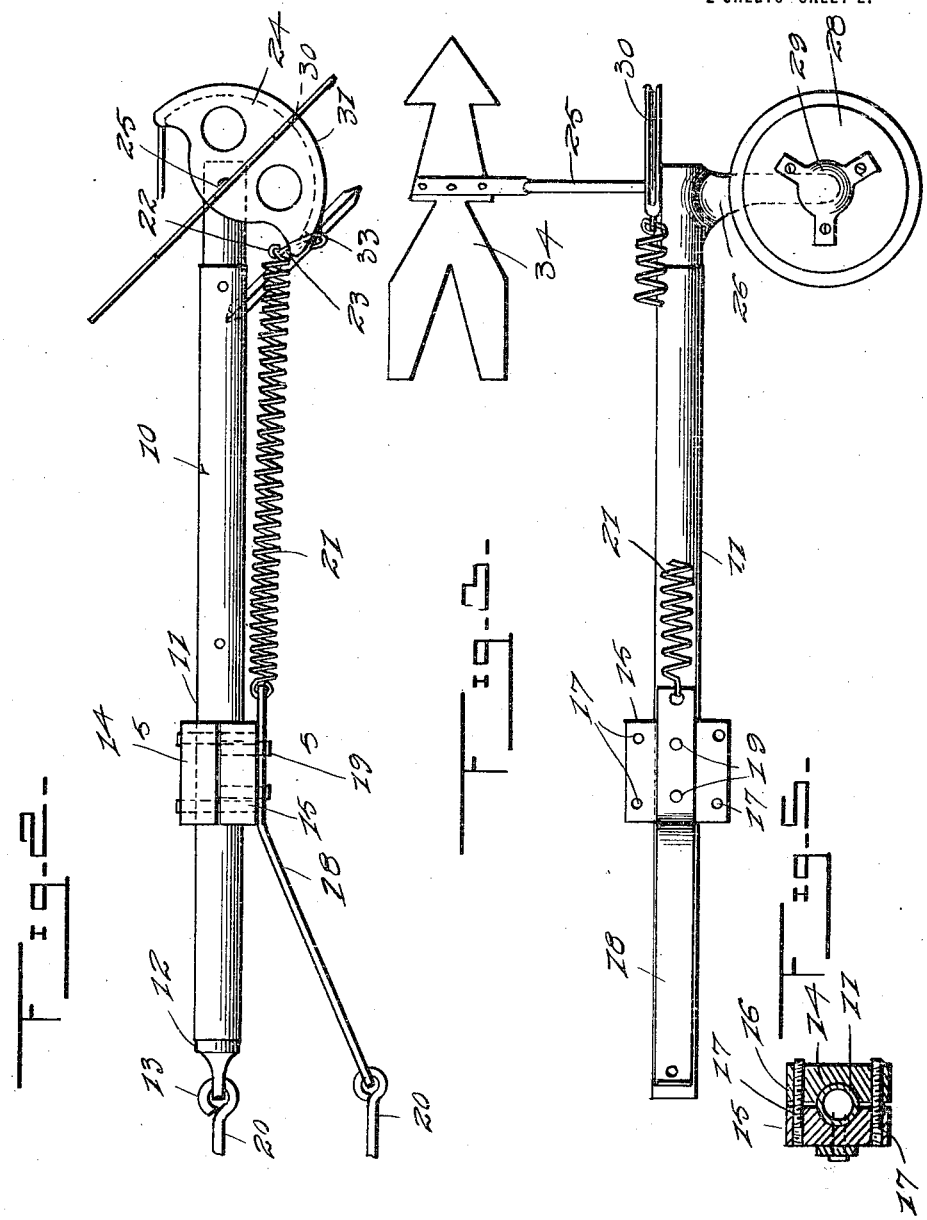

UNITED STATES PATENT OFFICE.

JOHN M. CARLSON, OF SHEYENNE, NORTH DAKOTA.

DIRECTION-INDICATOR FOR TRACTION-ENGINES.

1,271,851.  Specification of Letters Patent.  Patented July 9, 1918.

Application filed May 5, 1916. Serial No. 95,619.

*To all whom it may concern:*

Be it known that I, JOHN M. CARLSON, a citizen of the United States, residing at Sheyenne, in the county of Eddy and State of North Dakota, have invented certain new and useful Improvements in Direction-Indicators for Traction-Engines; and I do hereby declare the following to be a full, clear, and exact description of the invention, such as will enable others skilled in the art to which it appertains to make and use the same.

This invention relates to a direction indicator or steering apparatus for use on tractors, for indicating the direction to be taken by the tractor, and the primary object of the invention is to provide an indicator as specified which includes a rotatably mounted cam which is connected to the supporting wheel of the indicator for synchronous movement therewith, and which cam carries an indicating hand for indicating the direction to be taken by the tractor and further to connect the cam operatively to the steering apparatus or mechanism of the tractor proper for controlling the movement of the cam and the indicating hand by the operation of the steering mechanism of the tractor.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a plan view of the indicator showing it applied to a fragment of a tractor.

Fig. 2 is a plan view of the indicator independent of the tractor.

Fig. 3 is a side elevation of the indicator.

Fig. 4 is a fragmentary front end view of the indicator, and

Fig. 5 is a section on the line 5—5 of Fig. 2.

Referring more particularly to the drawings, 1 designates a fragment of a tractor of any ordinary construction which has a front bolster 2, and a shaft 3 which is operatively connected to the steering post 4 of the tractor and to the flexible members 5 which control the steering movement of the front wheels 6 of the tractor. The indicator which is generically indicated by the numeral 10, comprises a tube 11, which has a plug 12 inserted in its rear end to which plug an eye-bolt 13 is connected. The bolt 13 is adapted for extension through the front bolster 2 of the tractor for connecting the indicator structure 10 to the tractor. A block structure 14 is slidably mounted upon the tube 11 and comprises sections 15 and 16 which are held connected by means of bolts 17. A bar 18 is connected to the block structure 14 as shown at 19 and it has an eye-bolt 20 connected thereto which is also connected to the front bolster 2. A contractile spiral spring 21 is connected to the forwardly extending end of the bar 18 and it is connected to a loop 22 formed upon a rod 23 which is connected to one corner of a sector 24. The sector 24 is mounted upon a rod 25 which is rotatably carried by the forward end of the indicator structure 10 and extends downwardly below the rod and through a bearing 26, and an angled bearing 27. The rod 25 has its lower end angled for forming an axle for supporting the supporting wheel 28 of the indicator structure. The supporting wheel 28 is mounted upon the lower angled end of the rod 25 and is retained thereon by a suitable clamp structure indicated at 29. The sector 24 is provided with a groove 30 which is formed in its arcuate end 31 which receives a cord or cable 32. The cord or cable 32 is connected to the hooked end 33 of the rod 23 and it extends about the curved face 30 of the sector 24 and rearwardly as clearly shown in Fig. 1 of the drawings. The rear end of the cable or cord 32 is wound about and connected to the shaft 3 of the tractor structure so that it will be wound upon the shaft or permitted to unwind therefrom upon different directions of rotation of the shaft by the operation of the steering post 4. An indicating hand or arm 34 is attached to the upper end of the rod 25 and is positioned so that it will point in the direction in which the supporting wheel 28 travels.

The spring 21 is normally held under tension, as shown in Fig. 1 of the drawings, when the tractor is traveling straight ahead. When the tractor turns to the left, the shaft 3 is rotated through the medium of the steering post 4 in the direction for steering the front wheel 6 to the left, which will wind the cable or cord 32 upon the shaft and consequently pull the sector 33 around toward the left which will also turn the front wheel 28 to the left and the indicating hand therewith. When the tractor is steered toward the right, the shaft 3 will be rotated in the direction for permitting of the unwinding of the cable or cord 32 therefrom, and the spring 21 will contract, which will pull the sector toward the right and consequently turn the rod 25 so as to cause the wheel 28 to travel toward the right and the indicator 34 to point in the direction taken by the wheel 28.

From the foregoing description taken in connection with the accompanying drawings, the advantages of construction and of the method of operation of the improved direction indicator for traction engine will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a direction indicator for traction engines a supporting tube, a block structure slidably carried by said tube, a bar connected to said block structure, means carried by said tube and said bar for connection with a tractor structure, a substantially vertical rod rotatably carried by the outer end of said tube structure, a sector mounted upon said rod for movement therewith, the lower end of said rod being bent for forming a supporting axle, a supporting wheel mounted upon said axle at the end of said rod, a contractile spring connected to said bar and to said sector, means connected to the tractor steering structure for normally holding said wheel in a position parallel with the line of travel of the tractor and against the contracting action of said spring, and an indicating arm carried by the upper end of said rod for movement therewith.

2. In a device as set forth, a vertical indicating arm carrying rod, a sector mounted upon said rod for rotation therewith, a guiding wheel carried by said rod, a contractile spring connected to said sector, said sector being provided with a concave arcuate edge, a cable connected to said sector in close proximity to the connection between the sector and the spring, said cable extending about said concave arcuate edge and adapted for connection with the steering structure of a tractor for holding the sector against contracting action of said spring and holding said wheel in a position parallel with the line of travel of the tractor.

3. In a device as set forth, an indicator structure including a supporting tube, a block structure slidably carried by said tube, a bar connected to said block structure, means carried by said tube and said bar for connecting them with a tractor structure, a substantially vertical rod rotatably carried by the outer end of said tube, a sector mounted upon said rod for rotation therewith, the lower end of said rod being bent for forming a supporting axle, a supporting guiding wheel mounted upon said axle, a contractile spring connected to said bar and to said sector, said sector being provided with a concave arcuate edge, a cable connected to said sector in close proximity to the point of connection between the sector and said contractile spring, said cable extending above said concave arcuate surface and adapted for connection with the steering structure of a tractor for normally holding said sector against contracting action of said spring and holding said wheel in a position parallel with the line of travel of the tractor, and an indicating arm carried by the upper end of said rod for movement therewith.

4. In a device as set forth, a supporting shoe having a depending bearing formed upon its forward end, a vertical rod supported by said bearing, a guiding wheel carried by the lower end of said rod, an indicator carried by the upper end of said rod, a sector mounted upon said rod, a cable attached to said sector near one end of the curved side thereof and extending about the curved side for rotating the sector and rod upon movement of the cable, a bar attached to said supporting shoe, a contractile coil spring connected to the forward end of said bar and to said sector in close proximity to the connection between the cable and the sector, said spring held under tension by said cable when said wheel and indicator are positioned parallel with said supporting shoe.

In testimony whereof I affix my signature in presence of two witnesses.

JOHN M. CARLSON.

Witnesses:
 ODIE FULDER,
 GEO. BERYL OUREN.

Copies of this patent may be obtained for five cents each, by addressing the "Commissioner of Patents, Washington, D. C."